United States Patent [19]

Tanaka

[11] Patent Number: 4,739,649

[45] Date of Patent: Apr. 26, 1988

[54] METHOD OF AND APPARATUS FOR DETECTING MAXIMUM CYLINDER PRESSURE ANGLE IN INTERNAL COMBUSTION ENGINE

[75] Inventor: Akira Tanaka, Wako, Japan

[73] Assignee: Honda Giken Kogyo Kabushiki Kaisha, Tokyo, Japan

[21] Appl. No.: 63,937

[22] Filed: Jun. 19, 1987

[30] Foreign Application Priority Data

Jun. 25, 1986 [JP] Japan .................................. 61-147140

[51] Int. Cl.⁴ .......................................... G01M 15/00
[52] U.S. Cl. ...................................... 73/115; 73/117.3
[58] Field of Search ...................... 73/115, 117.3, 116; 123/425, 494

[56] References Cited

U.S. PATENT DOCUMENTS 4,601,196  7/1986  Frelund .................................. 73/115
4,672,843  6/1987  Pozniak ............................. 73/115 X Primary Examiner—Jerry W. Myracle Attorney, Agent, or Firm—Armstrong, Nikaido, Marmelstein & Kubovcik

[57] ABSTRACT

A method of and an apparatus for detecting the maximum cylinder pressure angle in an internal combustion engine. The method comprises the steps of measuring the time lapse required for the engine crankshaft to pass between a reference crankshaft angle such as TDC and the crankshaft angle at which the cylinder pressure becomes maximum and multiplying the measured time lapse by a time-angle conversion factor. The rate of change in the engine rotation speed is taken into consideration in carrying out the time-angle conversion so that it is possible to accurately determine the position at which the cylinder pressure becomes maximum in terms of crankshaft angle regardless of the operating condition of the engine. In the apparatus, the engine speed change rate is also compensated. The time-angle conversion can be carried out accurately even when there is used a crankshaft angle sensor which detects the crankshaft angle at relatively large intervals such as once every 30 degrees.

8 Claims, 5 Drawing Sheets

Cylinder identification signal (every 720°)
TDC signals (every 180°)
Unit angle signals (every 30°)
Unit angle intervals (stages)
Stage periods
Maximum pressure position
Lapsed time (Tpmax)
Maximum pressure angle (θpmax)

METHOD OF AND APPARATUS FOR DETECTING MAXIMUM CYLINDER PRESSURE ANGLE IN INTERNAL COMBUSTION ENGINE

BACKGROUND OF THE INVENTION

1. Field of the Invention

This invention relates to a method of and an apparatus for detecting the maximum cylinder pressure angle in an internal combustion engine, and more particularly to a method of and an apparatus for detecting the maximum cylinder pressure angle in an internal combustion engine in which the maximum cylinder pressure position is once obtained as a time value and is thereafter converted into an angular value by multiplying by a time-angle conversion factor.

2. Description of the Prior Art

There are known methods or apparatuses for detecting the crankshaft angle of an internal combustion engine at which the cylinder pressure becomes maximum and for controlling the ignition timing or the like of the internal combustion engine on the basis of the detected maximum cylinder pressure angle. For example, Japanese Laid-open Patent Publication No. 58(1983)-197470 discloses an apparatus in which the maximum cylinder pressure angle is determined using a crankshaft angle sensor which detects the crankshaft angle once every unit angle of rotation, for instance, once every degree of rotation. This conventional apparatus thus detects the maximum cylinder pressure angle directly in terms of the crankshaft angle and not by first once determining the position of the crankshaft as a time value. When the maximum pressure angle is obtained directly as a crankshaft angle as in the aforesaid conventional apparatus, it is necessary to employ a sensor capable of accurately detecting the crankshaft angle, for example, once every angle of rotation. This is disadvantageous since it is extremely difficult and very expensive to fabricate a sensor capable of such high-precision measurement.

Therefore, methods or apparatuses have been employed in which the position at which maximum pressure occurs is first measured as a time value and the measured time value is thereafter multiplied by a time-angle conversion factor to convert it into an angle. In this case, the time-angle conversion factor is usually calculated as (engine rpm × 360 degrees)/60 sec. However, since the engine rotational speed (rpm) varies during acceleration or other transient condition of engine operation, it is necessary to avoid the influence of such variation by instantaneously detecting the engine rpm. The conventional method or apparatus for doing this will be explained with reference to FIG. 5 taking a four-cylinder engine by way of example. In addition to obtaining a cylinder identification signal once every 720 degrees rotation of the crankshaft and a TDC (top dead center) signal once every 180 degrees rotation thereof, unit crankshaft angles $\theta 0-\theta 5$ are detected once every 30 degrees rotation of the crankshaft. The conversion factor is calculated from the periods ME1–ME6 of the intervals S1–S6 between the unit crankshaft angles $\theta 0-\theta 6$ (these intervals being referred to as "stages" hereinafter) and, in particular, is calculated from the period ME1 of stage S1, which is the stage during which the maximum pressure Pmax occurs. As will be noted from FIG. 6 relating to one reciprocation of a piston, however, the engine rpm is not constant even during steady-state engine operation but varies as a function of piston position, power stroke pressure and the like. Thus, when the engine rpms Ne0 to Ne5 at angles $\theta 0$ to $\theta 5$ are calculated and the rate of change aNE is found as $$aNE = \frac{Nen}{Nen - 1},$$

it is found that the angular velocity varies as shown in FIG. 7. Therefore, in calculating the time-angle conversion factor, even if the calculation is carried out using the period ME1 of the stage S1 in which the maximum pressure value occurs, the calculated angular step will be erroneous since the period ME1 represents nothing more than the average rpm value within stage S1. In other words, as shown in FIG. 8, where the actual crankshaft angle is 13 degrees ATDC (after top dead center), the value of $\theta$pmax calculated from ME1 will be 14 degrees ATDC, i.e. will be larger than the actual value. This error in the direction of retardation will result in an error in the control of the ignition timing or the like, which in turn will lower the engine operating efficiency.

SUMMARY OF THE INVENTION

The object of the invention is to provide a method of and an apparatus for detecting the maximum cylinder pressure angle in an internal combustion engine which enables the crankshaft angle at which the maximum pressure occurs to be calculated accurately by taking into consideration the rate of change in the engine rpm when carrying out the time-angle conversion.

For achieving the aforesaid object, the present invention provides, in one of its aspects, a method of detecting the maximum cylinder pressure angle in an internal combustion engine wherein the cylinder pressure of the internal combustion engine is detected and the position at which the pressure becomes maximum is determined, the time lapse between a reference crankshaft angle and the maximum pressure position is measured, and the measured value is multiplied by a time-angle conversion factor that has been compensated for the rotational speed of the engine. The time-angle conversion factor is obtained based on the rate of change between periods each corresponding to a unit crankshaft angle. More specifically, the rate of change is calculated from the periods of the unit crankshaft angle intervals immediately before and after the reference crankshaft angle and a predicted rate of change at the maximum pressure position interpolated therefrom. Also for achieving the aforesaid object, the present invention provides, in another of its aspects, an apparatus for detecting maximum cylinder pressure angle in an internal combustion engine comprising, a pressure sensor disposed at a cylinder of the engine for detecting cylinder pressure in the engine, a crankshaft angle sensor disposed in the vicinity of a rotating member of the engine for detecting a reference angular position of the crankshaft of the engine, means for receiving outputs of the sensors and for determining the crankshaft angular position at which the cylinder pressure becomes maximum, means for receiving outputs of the crankshaft angle sensor and the maximum cylinder pressure determining means and for measuring the time lapse required for the crankshaft to pass between the reference crankshaft angle and the crankshaft angle at which the cylinder pressure becomes maximum, and means for receiving output of the time lapse measuring means and for multiplying the measured time lapse by a time-angle conversion factor compensated for rate of change in engine rotation speed so as to obtain the maximum cylinder pressure angle in the engine.

The above and other features of the present invention will become apparent from the following description made with reference to the drawings.

DESCRIPTION OF THE PREFERRED EMBODIMENT

For ease of understanding, an apparatus for detecting the maximum pressure angle according to the invention will be described first.

Figure 1:
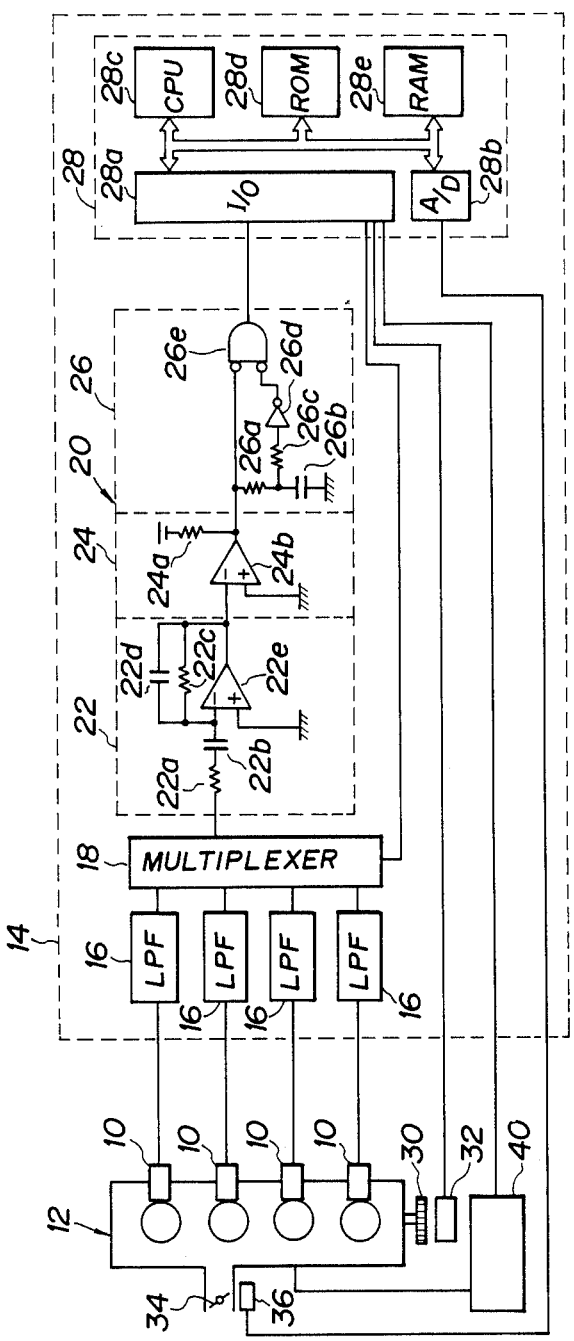
FIG. 1 is a block diagram of an apparatus for detecting the maximum cylinder pressure angle in an internal combustion engine according to the invention.
Figure 2:
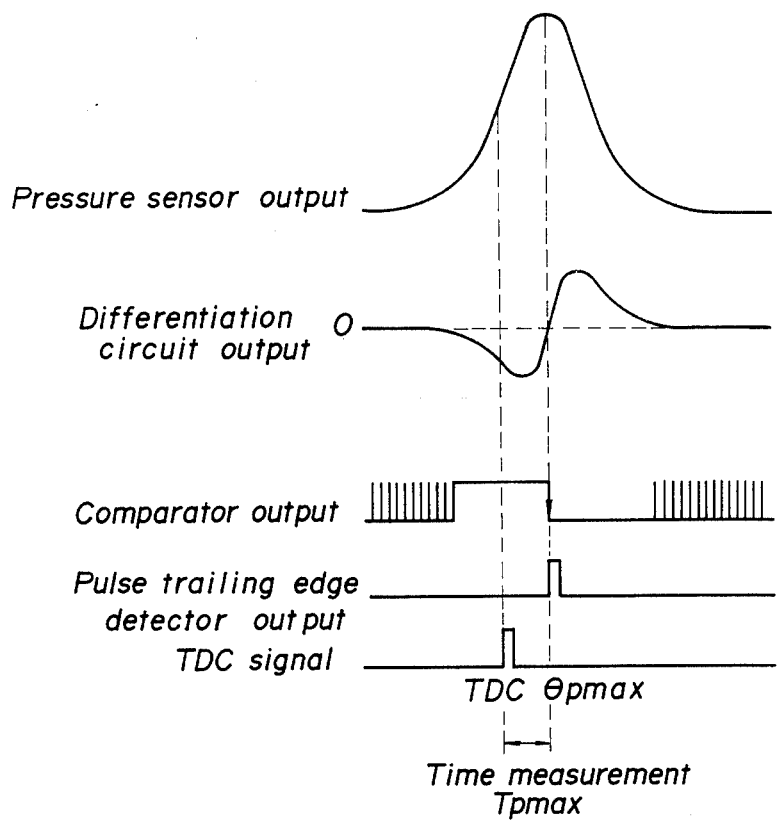
FIG. 2 is a timing chart showing the operation of the apparatus of FIG. 1.

FIG. 1 is a block diagram of a detection apparatus constituted as an ignition timing control apparatus and FIG. 2 is a diagram showing the waveforms of the outputs of this apparatus.

In FIG. 1, the reference numerals 10 denote piezoelectric pressure sensors for detecting the pressure within the cylinders of an internal combustion engine 12. The sensors 10 are disposed so as to face into the combustion chambers (not shown) of the cylinders. The illustrated example relates to a four-cylinder engine and the piezoelectric pressure sensors 10 are provided one per cylinder. The outputs of the pressure sensors 10 are converted to voltages by charge-voltage converter/amplifiers (not shown) and are then forwarded to a control unit 14 in which they are applied to respective low pass filters 16. The stage following the low pass filters 16 is a multiplexer 18 which is controlled by commands from a microcomputer to be described later so as to forward the outputs from the filters 16 to the succeeding stage in the firing order of the cylinders.

This succeeding stage is a maximum pressure position signal generator 20 constituted of a differentiating circuit 22, a comparator 24 and a pulse trailing edge detector 26. The differentiating circuit 22 is constituted of a resistor 22a, a capacitor 22b, a resistor 22c, a capacitor 22d and an operational amplifier 22e. As shown in FIG. 2, the differentiating circuit 22 serves to shift the phase of the waveform of the sensor outputs by 90 degrees. Consisting of a resistor 24a and an operational amplifier 24b, the comparator 24 compares the output from the differentiating circuit 22 with a standard voltage and, as shown in FIG. 2, shifts its output to low level L when the waveform output by differentiation circuit 22 crosses zero at the time the output of the sensor reaches peak value. The output of the comparator 24 is applied to the pulse trailing edge detector 26. The pulse trailing edge detector 26 consists of a resistor 26a, a capacitor 26b, a resistor 26c, an invertor 26d and a NOR gate 26e. The pulse trailing edge detector 26 detects the time at which the pulse output by comparator 24 falls and, as shown in FIG. 2, produces a timing pulse of a prescribed width easily processable by a microcomputer.

The output of the pulse trailing edge detector 26 is forwarded to a microcomputer 28 constituting the following stage of the generator 20. The microcomputer 28 comprises an input/output terminal board 28a, an A/D (analogue/digital) converter 28b, a CPU (central processing unit) 28c, a ROM (read-only memory) 28d and a RAM (random access memory) 28e. It further has a first time measurement circuit for measuring the time period Tpmax between the time that the piston arrives at the TDC position and the time that the pulse is output by the pulse trailing edge detector 26 and a second time measurement circuit for measuring the length of the periods ME1-ME6 of the stages S1-S5. (Neither of the time measurement circuits are shown.)

Figures 5, 6, 7:
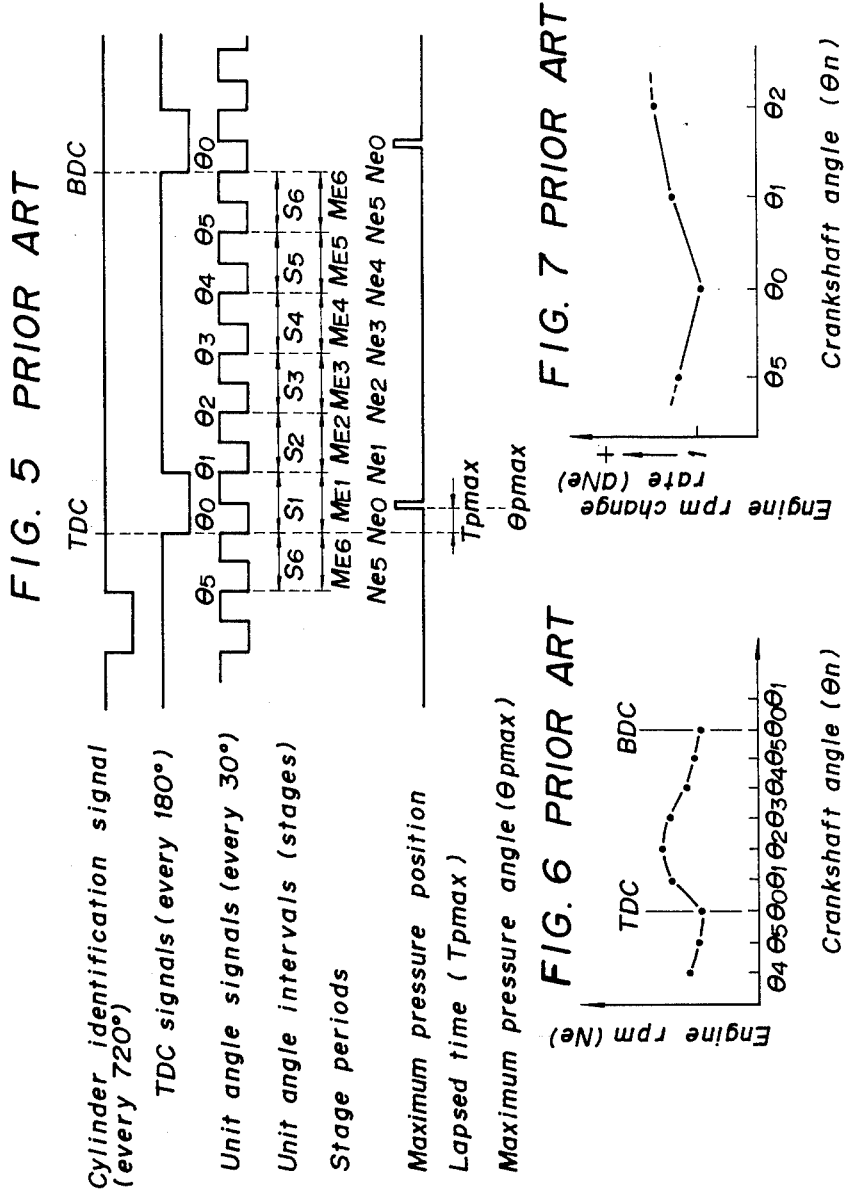
FIG. 5 is a diagram for explaining a conventional method of detecting the maximum pressure angle.
FIG. 6 is a diagram for explaining the variation in engine rpm within the unit crankshaft angles in FIG. 5.
FIG. 7 is a diagram for explaining the variation in engine angular velocity within the unit crankshaft angles in FIG. 5.
Figure 8:
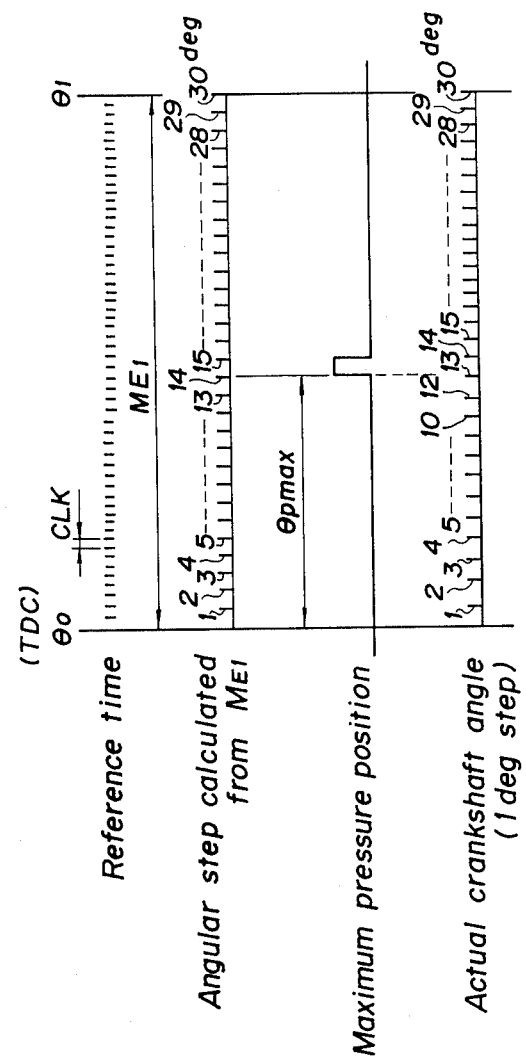
FIG. 8 is a diagram for explaining the error that arises between the crankshaft position calculated by the conventional method and the actual crankshaft position.

Further, a crankshaft angle sensor 32 is disposed in the vicinity of a rotating member 30 of the internal combustion engine 12 for detecting the angle of the crankshaft with which the engine pistons (not shown) are linked. Similarly to the prior art example illustrated in FIG. 5, the sensor 32 produces a cylinder identification signal once every 720 degrees rotation of the crankshaft, a TDC signal once every 180 degrees rotation of the crankshaft, and a unit crankshaft angle signal once every 30 degrees rotation of the crankshaft (at $\theta 0$-$\theta 5$). The signal indicating the angle $\theta 0$ is output in precise synchronization with the TDC position. At an appropriate position of the engine air intake passage downstream from a throttle valve 34 there is provided a pressure sensor 36 for detecting the absolute pressure in the intake passage and outputting a signal indicating the load condition of the engine. After being shaped by a waveform shaping circuit (not shown), the output from the crankshaft angle sensor 32 is input to the control unit 14 and sent to the microcomputer 28. The output of the pressure sensor 36 is sent to a level conversion circuit (not shown) and after being converted to a signal of appropriate level is input to the microcomputer 28 where it is converted into digital form by the A/D converter 28b.

On the basis of the input data, the microcomputer 28 first calculates the maximum pressure angles for the respective cylinders and then, after calculating the ignition timing, sends ignition commands to an igniter 40 to cause ignition of the air-fuel mixture in the engine combustion chambers. The microcomputer output is also sent to the multiplexer 18 for gate switchover thereof.

Figure 3:
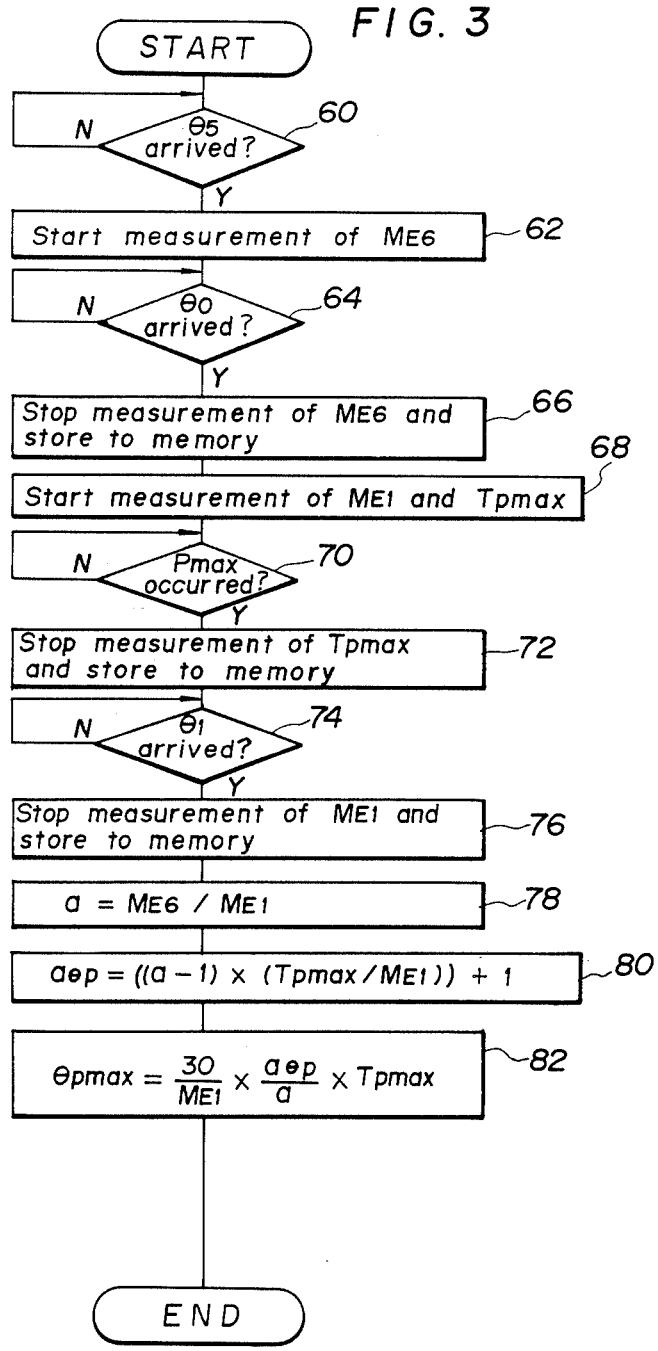
FIG. 3 is a flowchart illustrating the operation of the apparatus of FIG. 1 and an embodiment of a method of detecting the maximum cylinder pressure angle in an internal combustion engine according to the invention.

Mode of operation of the apparatus and an embodiment of the method of detection according to the invention will now be explained on the basis of the flowchart of FIG. 3.

First, in step 60 the arrival of the crankshaft at the crankshaft angular position $\theta 5$ (30 degrees BTDC (before top dead center)) is confirmed from the output of the crankshaft angle sensor 32. Then in step 62 the second time measurement circuit is started for measuring the period ME6 of the stage 6.

In step 64 the arrival of the crankshaft at the crankshaft angular position $\theta 0$ (the TDC position) is confirmed and in step 66 the second time measurement circuit is stopped and the measured period ME6 is stored in memory. At the same time, first and second time measurement circuits are started in step 68 for measuring the lapsed time Tpmax up to the position at which the maximum pressure occurs and the length of the period ME1 of the next stage S1. Then in step 70 the occurrence of the maximum pressure value Pmax is confirmed from the output of the pulse trailing edge detector circuit 26, whereupon the first time measurement circuit is stopped and the measured time value Tpmax is stored in memory in step 72.

Next, the arrival of the crankshaft at the crankshaft angle $\theta 1$ (30 degrees ATDC) is confirmed in step 74, and in step 76 the second time measurement circuit is stopped and the measured period ME1 is stored in memory. As the maximum pressure value Pmax generally occurs in the vicinity of 20 degrees ATDC, the crankshaft angle $\theta 1$ will be reached after the occurrence of the maximum pressure value.

Then in step 78 the engine rpm change rate a is calculated from the period ME6 of stage S6 and the period ME1 of stage 1, as follows:

$$a = \frac{ME6}{ME1}$$

Figure 4:
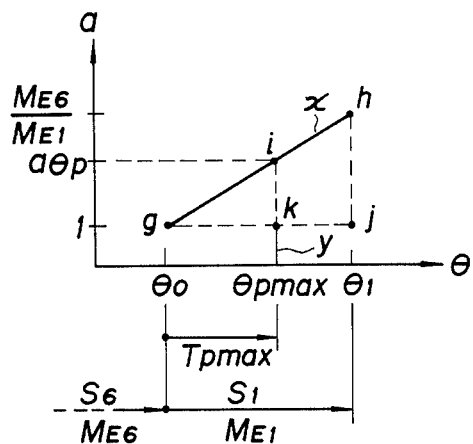
FIG. 4 is a diagram for explaining the calculation procedure according to the flowchart of FIG. 3.

In the following step 80, the predicted value of the engine rpm change rate at the maximum pressure position, i.e. the value $a\theta p$, is determined by interpolation. The method of calculation is shown in FIG. 4. Namely, the engine rpm change rate during stage S1 is represented by a line x connecting points g and h, and the point of intersection between the line x and a line y drawn vertically upward from the point representing the lapsed time Tpmax is taken as the predicted engine rpm change rate at the point at which the maximum cylinder pressure occurs. Thus, if the value of $a\theta p$ is determined by interpolation and the determined value is used to calculate the angular position of the crankshaft, it becomes possible to accurately determine the maximum pressure angle. In FIG. 4, since the triangle defined by the points g, h and j and the triangle defined by the points g, i and k are similar, it follows that the value $a\theta p$ can be found as;

$$a\theta p = ((a-1) \times (Tpmax/ME1)) + 1$$

Thus, based on the foregoing, the maximum pressure angle $\theta$pmax is calculated in step 82 according to the following;

$$\theta pmax = \frac{720 \text{ degrees}}{\text{Number of cylinders}} \times \frac{1}{\text{Number of stages} \times ME1} \times \frac{a\theta p}{a} \times Tpmax$$

$$= \frac{720 \text{ degrees}}{4} \times \frac{1}{6 \times ME1} \times \frac{a\theta p}{a} \times Tpmax$$

$$= \frac{30}{ME1} \times \frac{a\theta p}{a} \times Tpmax$$

Since as explained in the foregoing, the method of and the apparatus for the present invention determine the maximum pressure angle $\theta$pmax from (1) the predicted change rate $a\theta p$ calculated by interpolation based on the measured time value Tpmax up to the maximum pressure position, (2) the period ME1 of the stage in which the maximum pressure position is included, and (3) the measured time value Tpmax, they are capable of accurately compensating for variation in the actual angular position of the crankshaft caused by transition in piston position both during transient and steady-state engine operation, and thus have the advantage of being able to detect the maximum pressure angle $\theta$pmax with high accuracy. The invention further enables accurate detection of the maximum pressure angle without use of a hard-to-fabricate crankshaft angle sensor capable of detection at one-degree intervals but instead makes it possible to realize high-accuracy detection of the maximum pressure angle with the unit crankshaft angle set at a relatively low resolution (stage interval) of, say, 30 degrees. As a result, no need arises for increasing the resolution by subdividing the stage intervals, so that it is possible to obtain high-precision detection with a relatively simple apparatus. While in the embodiment described above, the TDC signal region (180 degrees) is divided into 6 equal stages of 30 degrees each, it should be noted that the stages S2 to S5 are not absolutely necessary and that the stage intervals need not necessarily be equal.

The present invention has thus been shown and described with reference to specific embodiments. However, it should be noted that the present invention is in no way limited to the details of the described arrangements but changes and modifications may be made without departing from the scope of the appended claims.

What is claimed is:

1. A method of detecting maximum cylinder pressure angle in an internal combustion engine, comprising the steps of:
  a. detecting cylinder pressure in an internal combustion engine and determining the angular position of a crankshaft of the engine at which the cylinder pressure becomes maximum;
  b. measuring the time lapse required for the crankshaft to pass between a reference crankshaft angle and the crankshaft angle at which the cylinder pressure becomes maximum; and
  c. multiplying the measured time lapse by a time-angle conversion factor compensated for rate of change in engine rotation speed.

2. A method according to claim 1 wherein the time angle conversion factor compensated for rate of change in engine rotation speed is obtained on the basis of a rate of change between periods of unit crankshaft angle intervals.

3. A method according to claim 2 wherein the rate of change between the periods of unit crankshaft angle intervals is calculated from the periods of unit crankshaft angle intervals before and after the reference crankshaft angle and a predicted rate of change at the maximum pressure position interpolated therefrom.

4. A method according to claim 3 wherein the unit crankshaft angle is relatively large in comparison with the desired detection accuracy.

5. A method according to any one of claims 1 to 4 wherein the reference crankshaft angle is the crankshaft angle at top dead center.

6. An apparatus for detecting maximum cylinder pressure angle in an internal combustion engine, comprising:
  a. a pressure sensor disposed at a cylinder of the engine for detecting cylinder pressure in the engine;

b. a crankshaft angle sensor disposed in the vicinity of a rotating member of the engine for detecting a reference angular position of the crankshaft of the engine;

c. means for receiving outputs of the sensors and for determining the crankshaft angular position at which the cylinder pressure becomes maximum;

d. means for receiving outputs of the crankshaft angle sensor and the maximum cylinder pressure determining means and for measuring the time lapse required for the crankshaft to pass between the reference crankshaft angle and the crankshaft angle at which the cylinder pressure becomes maximum; and e. means for receiving output of the time lapse measuring means and for multiplying the measured time lapse by a time-angle conversion factor compensated for rate of change in engine rotation speed so as to obtain the maximum cylinder pressure angle in the engine.

7. The apparatus according to claim 6 wherein the time angle conversion factor compensated for rate of change in engine rotation speed is obtained on the basis of a rate of change between periods of unit crankshaft angle intervals.

8. The apparatus according to claim 7 wherein the rate of change between the periods of unit crankshaft angle intervals is calculated from the periods of unit crankshaft angle intervals before and after the reference crankshaft angle and a predicted rate of change at the maximum pressure position interpolated therefrom.

* * * * *